(12) United States Patent
Liang et al.

(10) Patent No.: US 8,036,440 B2
(45) Date of Patent: Oct. 11, 2011

(54) SYSTEM AND METHOD FOR COMPUTER AIDED DETECTION OF PULMONARY EMBOLISM IN TOBOGGANING IN CT ANGIOGRAPHY

(75) Inventors: Jianming Liang, Chester Springs, PA (US); Jinbo Bi, Chester Springs, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 925 days.

(21) Appl. No.: 12/022,548

(22) Filed: Jan. 30, 2008

(65) Prior Publication Data
US 2008/0187201 A1    Aug. 7, 2008

Related U.S. Application Data

(60) Provisional application No. 60/888,165, filed on Feb. 5, 2007.

(51) Int. Cl.
*G06K 9/00* (2006.01)
*G06K 9/34* (2006.01)
(52) U.S. Cl. ........................ 382/131; 382/173
(58) Field of Classification Search ............... 382/131
See application file for complete search history.

(56) References Cited

U.S. PATENT DOCUMENTS

| | | | |
|---|---|---|---|
| 2004/0141638 A1* | 7/2004 | Acar et al. | 382/131 |
| 2005/0141765 A1* | 6/2005 | Liang et al. | 382/181 |
| 2005/0185838 A1* | 8/2005 | Bogoni et al. | 382/165 |
| 2006/0018549 A1* | 1/2006 | Liang et al. | 382/190 |
| 2006/0209063 A1* | 9/2006 | Liang et al. | 345/419 |
| 2007/0036406 A1* | 2/2007 | Bogoni et al. | 382/128 |

FOREIGN PATENT DOCUMENTS
WO    2006/042322 A    4/2006

OTHER PUBLICATIONS

Yao et al., Fast image segmentation by sliding in the derivative terrian, SPIE vol. 1607 Intelligent Robots and Computer Vision X: Algorithms and Techniques, 1991, pp. 369-379.*
Fung et al., "Multiple Instance Learning for Computer Aided Diagnosis", Neural Information Processing Systems, Dec. 4, 2006, pp. 1-8.
Fung et al., "Knowledge-Based Support Vector Machine Classifiers", Poceedings of the International Conference on Neural Information Processing, Jan. 1, 2002, pp. 1-8.
Vural et al., "Batch Classification with Applications in Computer Aided Diagnosis", Machine Learning: ECML 2006 Lecture Notes in Computer Science; Lecture Notes in Artificial Intelligence; Springer, Berlin, DE, vol. 4212, Jan. 1, 2006, pp. 449-460.
International Search Report of Application No. PCT/US2008/001474 dated Apr. 24, 2009.

* cited by examiner

*Primary Examiner* — David Zarka
(74) *Attorney, Agent, or Firm* — Peter Withstandley

(57) ABSTRACT

A method for detecting pulmonary embolisms in computed tomographic (CT) angiography includes providing a digitized (CT) image acquired from inside a pulmonary vessel, the image comprising a plurality of intensities corresponding to a 3-dimensional grid of voxels, for each voxel in the image, extracting a first pulmonary embolism (PE) candidate and PE boundary from the voxel, and for each voxel in the PE boundary, selecting a voxel from the PE boundary, extracting a subsequent PE candidate and PE boundary from the voxel, merging the subsequent PE candidate with the first PE candidate, and merging the subsequent PE boundary with the first PE boundary.

12 Claims, 11 Drawing Sheets

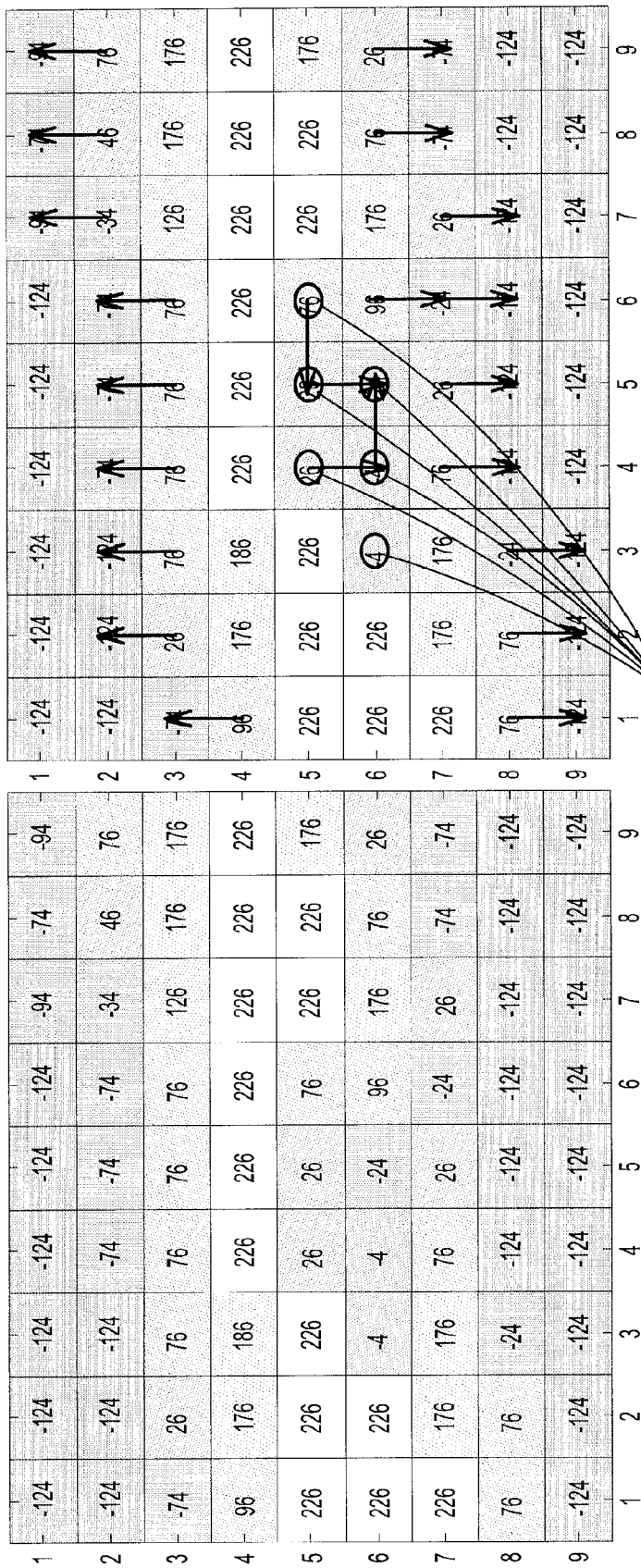

FIG. 3(b)

| | 1 | 2 | 3 | 4 | 5 | 6 | 7 | 8 | 9 |
|---|---|---|---|---|---|---|---|---|---|
| 9 | -124 | -124 | -74 | 26 | 176 | 226 | 176 | 76 | -94 |
| 8 | -124 | -124 | -74 | 76 | 226 | 226 | 176 | 46 | -74 |
| 7 | -124 | -124 | 26 | 176 | 226 | 126 | -34 | -94 | |
| 6 | -124 | -124 | -24 | (96) | (226) | 76 | -74 | -124 | |
| 5 | -124 | -124 | (26) | (226) | (226) | 76 | -74 | -124 | |
| 4 | -124 | -124 | (26) | (226) | 76 | -74 | -124 | | |
| 3 | 176 | (226) | 186 | 76 | -124 | -124 | | | |
| 2 | -124 | 76 | 176 | 226 | 226 | 176 | 26 | -124 | -124 |
| 1 | -124 | 76 | 226 | 226 | 226 | 96 | -74 | -124 | -124 |

FIG. 3(a)

| | 1 | 2 | 3 | 4 | 5 | 6 | 7 | 8 | 9 |
|---|---|---|---|---|---|---|---|---|---|
| 9 | -124 | -124 | -74 | 26 | 176 | 226 | 176 | 76 | -94 |
| 8 | -124 | -124 | -74 | 76 | 226 | 226 | 176 | 46 | -74 |
| 7 | -124 | -124 | 26 | 176 | 226 | 126 | -34 | -94 | |
| 6 | -124 | -124 | -24 | 96 | 76 | 226 | 76 | -74 | -124 |
| 5 | -124 | -124 | 26 | (26) | (226) | 76 | -74 | -124 | |
| 4 | -124 | -124 | 76 | (4) | 226 | 76 | -74 | -124 | |
| 3 | -124 | -124 | 176 | 4 | 226 | 186 | 76 | -124 | -124 |
| 2 | -124 | 76 | 176 | 226 | 226 | 176 | 26 | -124 | -124 |
| 1 | -124 | 76 | 226 | 226 | 226 | 96 | -74 | -124 | -124 |

FIG. 3(d)

|   | 1 | 2 | 3 | 4 | 5 | 6 | 7 | 8 | 9 |
|---|---|---|---|---|---|---|---|---|---|
| 9 | -94 | 76 | 176 | 226 | 176 | 26 | -74 | -124 | -124 |
| 8 | -74 | 46 | 176 | 226 | 226 | 76 | -74 | -124 | -124 |
| 7 | -94 | -34 | 126 | 226 | 226 | 176 | 26 | -124 | -124 |
| 6 | -124 | -74 | 76 | 226 | (16) | (16) | -24 | -124 | -124 |
| 5 | -124 | -74 | 76 | 226 | (16) | (26) | 26 | -124 | -124 |
| 4 | -124 | -74 | 76 | 226 | (16) | (4) | 76 | -124 | -124 |
| 3 | -124 | -124 | 76 | 186 | 226 | (4) | 176 | -24 | -124 |
| 2 | -124 | -124 | 26 | 176 | 226 | 226 | 176 | 76 | -124 |
| 1 | -124 | -124 | -74 | 96 | 226 | 226 | 226 | 76 | -124 |

|   | 1 | 2 | 3 | 4 | 5 | 6 | 7 | 8 | 9 |
|---|---|---|---|---|---|---|---|---|---|
| 9 | -94 | 76 | 176 | 226 | 176 | 26 | -74 | -124 | -124 |
| 8 | -74 | 46 | 176 | 226 | 226 | 76 | -74 | -124 | -124 |
| 7 | -94 | -34 | 126 | 226 | (226) | 176 | 26 | -124 | -124 |
| 6 | -124 | -74 | 76 | (226) | (16) | (16) | -24 | -124 | -124 |
| 5 | -124 | -74 | 76 | (226) | (26) | (26) | 26 | -124 | -124 |
| 4 | -124 | -74 | 76 | (226) | 26 | (16) | -4 | -124 | -124 |
| 3 | -124 | -124 | 76 | 186 | (226) | (4) | 176 | -24 | -124 |
| 2 | -124 | -124 | 26 | 176 | 226 | 226 | 176 | 76 | -124 |
| 1 | -124 | -124 | -74 | 96 | 226 | 226 | 226 | 76 | -124 |

— 31

Algorithm 1: A basic tobogganing algorithm

Input:
  p = P(v)    {toboggan potential p of voxel v; the original CT value for PE detection}
  lt    {the low threshold, set to -50 HU for PE detection}
  ht    {the high threshold, set to 100 HU for PE detection}

Output:
  l = L(v)    {toboggan cluster label l for voxel v, see note 1 for details}
  u = D(v)    {sliding direction, v slides to u}

Data Structure:
  S    {stack of slide voxels}

Functions:
  E = N(v)    {get neighbors E of voxel v}
  g = tob(v)    {g = arg min$_t \in N(v) \cup \{v\}$ P(t) }
  r = newLabel()    {a new label r; for PE detection, a single unique label $\mathcal{E}$ sufficient}

Steps:
  for each voxel v do begin
    if (L(v) = nil) then begin {process each unlabeled voxel v}
      {Step A: Initialization}
      u ← v;  S ← ∅;
      {Step B: Sliding to a labeled voxel or a concentration}
      repeat
        u' = tob(u);
        if (u' ≠ u) then begin
          S ← u; D(u) ← u'; u ← u';
        end else {found concentration – a voxel cannot slide to any of its neighbors}
          break;
      until (L(u) ≠ nil)
      {Step C: Assigning a new label to u if it is unlabeled}
      if (L(u) = nil) begin
        L(u) ← newLabel();  {L(u) ← $\mathcal{E}$ for PE detection}
      end
      {Step D: Labeling all voxels in S with u's label}
      for each r ∈ S do begin
        L(r) ← L(u);
      end
    end
  end

FIG. 6

Algorithm 2: A concentration oriented tobogganing

Input:
    $s$                           {initial site}
    $p = P(v)$            {toboggan potential p of voxel v; the original CT value for PE detection}
    lt                    {the low threshold, set to -50 HU for PE detection}
    ht                   {the high threshold, set to 100 HU for PE detection}

Output:
    C                   {toboggan cluster containing initial site $s$; initially empty}
    B                   {external boundary pixels of cluster C; initially empty}

Data Structures:
    A                   {Active list of voxels; initially empty}

Functions:
    $E = N(v)$             {get neighbors E of voxel v}
    $g = tob(v)$           {$g = \arg\min_{t \in N(v) \cup \{v\}} P(t)$ }
    $A = update(A, v)$    {$\forall r \in N(v), A \leftarrow r$, if $(r \notin A)$ and $(r \notin C)$ and $(P(r) \in [lt, ht])$ }
    $q = pop(A)$          {$q = \arg\min_{a \in A} P(a)$ }

Steps:
    {Step A: Find concentration $c$ of initial site $s$}
      c = s;
      repeat
        q = c;
        c = tob(q);
      until (q = c)
    {Step B: Expand from concentration $c$ with CT value in the PE HU range}
      if (P(c) $\in$ [lt, ht]) begin
        {Step B.1: Base Step}
          C $\leftarrow$ c;
          A = update(A, c);
        {Step B.2: Iterative Step}
          repeat
            q = pop(A);
            r = tob(q);
            if r $\in$ C begin
              C $\leftarrow$ q;
              A = update(A, q);
            end else begin
              B $\leftarrow$ q;
            end
          until A is empty
      end

FIG. 7

Algorithm 3: detecting PE

Input:
    p = P(v)                {toboggan potential p of voxel v; the original CT value for PE detection}
    lt                       {the low threshold, set to -50 HU for PE detection}
    ht                      {the high threshold, set to 100 HU for PE detection}

Output:
    M                     {detected PE candidates; initially empty}

Data Structures:
    B                      {external boundary pixel list}
    C                      {A PE candidate – connected component – with multiple clusters}

Functions:
    [C, B] = COT(s,p,lt,ht)     {concentration-oriented toboggan algorithm applied at initial site s yields cluster C and external boundary B}

Steps:
```
for each voxel v do begin
    [C, B] = COT(v,p,lt,ht);
    if C is not empty then begin
        while B is not empty do begin
            b ← B  {A boundary pixel b selected and removed from B}
            [C`, B`] = COT(b,p,lt,ht);
            if C` is not empty do begin
                B = B ∪ B`;  {added with the newly found boundary pixels B`}
                C = C ∪ C`;  {merged with the newly extracted cluster}
            end
        end
        M ← C;  {A PE candidate C formed and added to M}
    end
end
```

FIG. 8

SYSTEM AND METHOD FOR COMPUTER AIDED DETECTION OF PULMONARY EMBOLISM IN TOBOGGANING IN CT ANGIOGRAPHY

CROSS REFERENCE TO RELATED UNITED STATES APPLICATIONS

This application claims priority from "Computer Aided Detection of Pulmonary Embolism with Tobogganing in CT Angiography", U.S. Provisional Application No. 60/888,165 of Jianming Liang, et al., filed Feb. 5, 2007, the contents of which are herein incorporated by reference.

TECHNICAL FIELD

This disclosure is directed to the detection of pulmonary embolisms in CT angiography.

DISCUSSION OF THE RELATED ART

Pulmonary embolism (PE) is the third most common cause of death in the US with at least 650,000 cases occurring annually. PE is a sudden blockage in a lung artery, and is caused by an embolus that is formed in one part of the body and travels in the bloodstream through the heart before reaching the lungs. PE is a very serious condition that can cause sudden death in about one-third of the cases. Most of those who die do so within 30 to 60 minutes after symptoms start. Treatment with anti-clotting medications is highly effective but not without complications. The anti-clotting medications can sometimes lead to subsequent hemorrhaging and bleeding, thus, they should only be given to those who really need them. Therefore, a major clinical challenge, particularly in an emergency room scenario, is to quickly and correctly diagnose patients with PE and then send them on to treatment, as a prompt and accurate diagnosis is the key to survival.

However, PE is among the most challenging conditions to diagnosis because its primary symptoms are vague, non-specific, and may have a variety of other causes, making it hard to separate out the critically ill patients suffering from PE. The diagnosis of PE is missed more than 400,000 times in the US each year, and approximately 100,000 patients die who would have survived with the proper diagnosis and treatment.

Computed tomographic (CT) Pulmonary Angiography (CTPA) has become a first-line diagnosis technique for PE. Significant PEs are detectable given the high spatial resolution of modern CT scanners. A CT image is a large 3D volumetric image, which includes hundreds of images, each representing one slice of the lung. Clinically, manual reading of these slices is laborious, time consuming and complicated by various PE look-alikes (false positives) including respiratory motion artifacts, flow-related artifacts, streak artifacts, partial volume artifacts, stair step artifacts, lymph nodes, and vascular bifurcation, among many others. The accuracy and efficiency of interpreting such a large image data set is also limited by human factors, such as attention span and eye fatigue. Consequently, it is highly desirable to have a computer aided detection (CAD) system to assist radiologists in detecting and characterizing emboli in an accurate, efficient and reproducible way. Such a CAD system has to achieve a high detection sensitivity with few false positives to acquire clinical acceptance. It also needs to satisfy stringent real-time requirement. For clinical use, all the detections reported by a CAD systems must be reviewed and approved by radiologists. Existing PE CAD systems use a pipe-line architecture and only report the final detection at the end of execution, implying that the radiologist has to wait until the end of the system run in order to review and approve any detections. However, in an ER (Emergency Room) scenario, radiologists only have a small time window (2-3 minutes) to read a case and make the diagnosis. They cannot wait till the end of run to examine all the CAD detection. It is desired to have a CAD system that consecutively highlights any detected PEs, where each CAD finding is quickly obtained and immediately highlighted to radiologists, so it may be reviewed by a radiologist while the CAD system continues searching for more PEs.

A number of computer aided diagnosis methods have been developed. These existing methods are all based on sophisticated vessel segmentation, namely, first segmenting the pulmonary vessel structure and then searching for PEs within the segmented vessels, because a PE only exists in a pulmonary artery. However, vessel segmentation is computationally time consuming and has been problematic for small vasculature where subsegmental PEs often occur. Furthermore, the normal regions of pulmonary vessels are enhanced with contrast material. There is no need to search for PEs in the enhanced normal regions. Therefore, even if the pulmonary vascular structure is correctly segmented, large part of it would be excluded anyway.

Existing algorithms in the literature include watershed, hierarchical tobogganing, intelligent paint, and intelligent scissor" (i.e., "live-wire"). Watershed algorithms include rainfalling simulation and hill climbing. The watershed technique based on hill climbing requires that all the minima be found in advance and marked with distinct labels followed by "hill climbing". This implies that one would not be able to obtain a watershed region till the whole image has been scanned and processed. "Hierarchical tobogganing" is to repeatedly apply the basic toboggan algorithm, forming a toboggan hierarchy. "Intelligent paint" is built on top of hierarchical tobogganing to allow the user to interactively "select" the pre-formed toboggan regions at a user pre-specified toboggan hierarchical level, based on cost-ordered region collection. "Intelligent scissor" or interactive "live-wire" aims to compute an optimal path from a selected seed point to every other points in the image based on unrestricted graph search, so that the user can move the mouse freely in the image plane and interactively "select" a desired path among all the optimal paths based on the current cursor position. The underlying algorithm is Dijkstra's algorithm, which computes a shortest path from a given point to every other points in the image. However, for large images, the underlying graph created in live-wire for search becomes large, the interativeness of livewire would be comprised due to fundamental limitations of Dijkstra's algorithm. An alternative is toboggan-based livewire, in which the basic toboggan algorithm is applied to reduce the underlying graph in livewire to achieve highly efficient interaction in image segmentation. In short, none of the discussed algorithms can extract a toboggan cluster from an initial site without processing pixels beyond its external boundary.

SUMMARY OF THE INVENTION

Exemplary embodiments of the invention as described herein generally include methods and systems for a toboggan-based approach to automated computer aided detection of pulmonary embolism in CT angiography. A method according to an embodiment of the invention uses a set of distinguished features that requires no vessel segmentation, reports any detection incrementally in real time, and detects both acute and chronic pulmonary emboli, achieving 80% sensitivity with 4 false positives. A method according to an embodiment of the invention is also highly interactive, capable of reporting any PE detection in real time for radiologist to review and approval, while it continues searching for any additional PEs, thus meeting ER requirements.

According to an aspect of the invention, there is provided a method for detecting pulmonary embolisms in computed tomographic (CT) angiography, including providing a digitized (CT) image acquired from inside a pulmonary vessel, the image comprising a plurality of intensities corresponding to a 3-dimensional grid of voxels, for each voxel in the image, extracting a first pulmonary embolism (PE) candidate and PE boundary from the voxel, and for each voxel in the PE boundary selecting a voxel from the PE boundary, extracting a subsequent PE candidate and PE boundary from the voxel, merging the subsequent PE candidate with the first PE candidate, and merging the subsequent PE boundary with the first PE boundary.

According to a further aspect of the invention, extracting a pulmonary embolism (PE) candidate and PE boundary from a voxel comprises tobogganing the voxel to a first concentration voxel, initializing a cluster with the first concentration voxel, and assigning to an active list all neighboring voxels whose intensity is indicative of being part of an embolism, removing a voxel with a minimal intensity from the active list, tobogganing the removed voxel to a second concentration voxel, where if the second concentration voxel is part of the cluster, assigning neighbors of the removed voxel to the active list, otherwise assigning the removed voxel to a boundary of the cluster, and repeating the steps of removing a voxel from the active list and tobogganing the removed voxel to a second concentration voxel until the active list is empty, where the cluster is the pulmonary embolism candidate.

According to a further aspect of the invention, tobogganing a voxel comprises finding a concentration voxel from among the voxel and its neighboring voxels that has a minimum intensity.

According to a further aspect of the invention, the method includes adding the removed voxel to the cluster, when the second concentration voxel is part of the cluster.

According to a further aspect of the invention, the method includes classifying the pulmonary embolism candidate as a true candidate or a false candidate by calculating an image-based feature vector x for the candidate and comparing the feature vector to a classification function $w^T x + b$ which divides a feature space into a false candidate space and a true candidate space.

According to a further aspect of the invention, the classifier function coefficients w and intercepts b are found by solving $$\min_{w,\xi} \gamma \|w\|_1 + \sum_{j=1}^{m}\left(\sum_{i \in I_j} \lambda_i \xi_i\right) + \sum_{i \in I^-} \xi_i,$$

$$\text{s.t. } w^T x_i + b \geq 1 - \xi_i, i \in I^+, I^+ = \bigcup_{j=1}^{m} I_j$$

$$w^T x_i + b \leq -1 + \xi_i, i \in I^-,$$

$$\xi_i \geq 0, i = 1, \ldots, l,$$

$$\sum_{i \in I_j} \lambda_i = 1, \lambda_i \geq 0, i \in I_j, j = 1, \ldots, m,$$

for a training set of true and false pulmonary embolism candidates, where $I^+$ and $I^-$ are index sets containing indices of true candidates that intersect with PEs and false candidates that do not intersect with PEs, respectively, and $I_j$ is an index set of the candidates that intersect with a $j^{th}$ PE, $j=1, \ldots, m$.

According to a further aspect of the invention, an intensity indicative of being part of an embolism is in the range of between about −50 Hounsfield Units (HU) and about 100 HU.

According to another aspect of the invention, there is provided a program storage device readable by a computer, tangibly embodying a program of instructions executable by the computer to perform the method steps for detecting pulmonary embolisms in computed tomographic (CT) angiography.

BRIEF DESCRIPTION OF THE DRAWINGS

FIGS. 2(a)-(b) illustrate PE detection with a basic tobogganing algorithm, according to an embodiment of the invention.

FIGS. 3(a)-(d) illustrates the use of a concentration-oriented toboggan algorithm for PE detection, according to an embodiment of the invention.

FIG. 6 presents pseudo-code of a basic tobogganing algorithm, according to an embodiment of the invention.

FIG. 7 presents pseudo-code of an exemplary concentration oriented tobogganing algorithm according to an embodiment of the invention.

FIG. 8 presents pseudo-code of a loop for interactively invoking the concentration oriented tobogganing algorithm of FIG. 7, according to an embodiment of the invention.

DETAILED DESCRIPTION OF EXEMPLARY EMBODIMENTS

Figure 1:
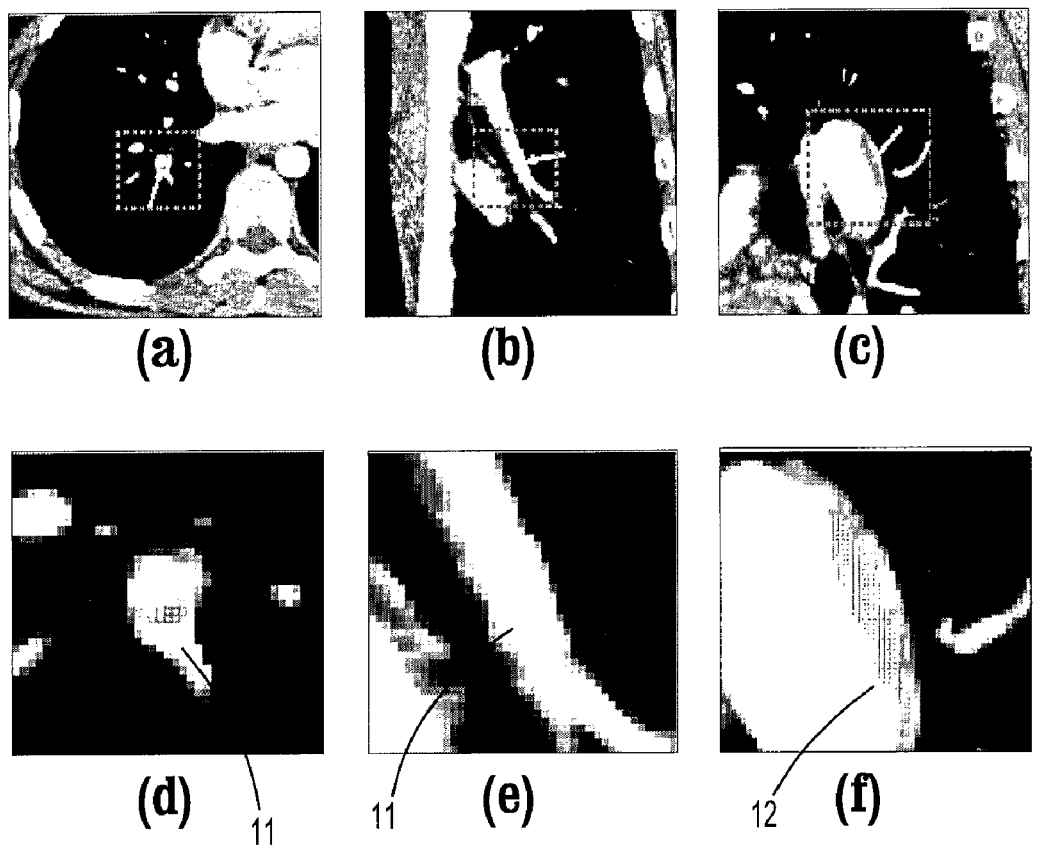
FIGS. 1(a)-(f) illustrate some exemplary pulmonary embolisms, according to an embodiment of the invention.

Exemplary embodiments of the invention as described herein generally include systems and methods for computer aided detection of pulmonary embolism with tobogganing in CT angiography. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Basic Tobogganing

Pulmonary embolisms may be acute or chronic, only exist in pulmonary arteries and are generally attached to the vessel wall. FIGS. 1(a)-(f) illustrate some exemplary PEs. FIGS. 1(a) and (b) depict acute emboli, while FIG. 1(c) depicts a chronic embolism. The emboli appear as dark regions residing in bright vessel lumen, and are in the boxed regions of FIGS. 1(a)-(c). A toboggan-based approach according to an embodiment of the invention is capable of detecting both acute and chronic emboli, offering simultaneous detection and segmentation, shown respectively in FIGS. 1(d), (e), and (f). The acute emboli are indicated by reference number 11, while the chronic embolism is indicated by reference number 12. The clot in FIG. 1(b) was actually missed by a radiologist, but was correctly detected by a system according to an embodiment of the invention, and confirmed by the radiologist. Due to the nature of their formation, CTPA reveals emboli, whether acute or chronic, as dark regions with Hounsfield Units (HU) between about −50 HU and about 100 HU, residing in contrast enhanced bright vessel lumen. However, due to partial volume effects, the pixels around the vessel boundaries are also in the same HU range. Therefore, a challenge for automatic PE detection is to effectively separate the emboli from the vessel wall and to quickly remove partial volume effects around the vessel boundaries while correctly preserving the PE pixels. In response to this challenge, according to an embodiment of the invention, all the voxels with Hounsfield Units (HU) between −50 HU and 100 HU are slid to a neighbor with minimal HU value and all voxels that don't slide into regions with Hounsfield Unit below −50 HU are collected. FIGS. 2(a)-(b) illustrate PE detection with a basic tobogganing algorithm as summarized in FIG. 6, described below. In this small PE image, pixels with CT values below −50 HU are in dark gray squares, pixels with CT value above 100 HU are in white squares and all other pixels are in light gray squares. All the PE pixels are in the light gray squares. The arrows indicate the directions in which voxels are slid. However, due to partial volume effects, the pixels around the artery boundaries are also light gray. A method according to an embodiment of the invention can effectively detect the PE, indicated by reference nos. 21 in FIG. 2(b), and remove the partial volume effects.

A basic tobogganing method according to an embodiment of the invention is summarized as Algorithm 1 in FIG. 6 and described as follows. Tobogganing takes its name from the analogy of sliding down a steep hill and will be referred as "basic tobogganing" herein below to be differentiated from a novel tobogganing algorithm according to an embodiment of the invention, referred to herein as concentration oriented tobogganing, also described below.

A basic operation in tobogganing is "sliding". A pixel v with intensity P(v) and neighbors N(v) slides down to pixel g:

$$g = \operatorname*{argmin}_{t \in N(v) \cup \{v\}} P(t). \qquad (1)$$

In cases where a pixel is surrounded by more than one pixel with the same minimal intensity value, the first pixel found with the minimal value can be chosen, or other more sophisticated strategies may be used in selecting a neighbor. A pixel that cannot slide to any of its neighbors is called a concentration. All the pixels that slide down to the same concentration form a toboggan cluster with a unique label.

Referring now to Algorithm 1, the basic tobogganing algorithm operates as follows. The algorithm determines a label for a PE voxel. It may generate a different label for each toboggan cluster, but for the purpose of PE detection, a single unique label is sufficient, since connected component analysis may be performed to merge all the collected PE voxels into a detection. The output l=L(v) may be regarded as a function, which has pre-determined label for some voxel v. In PE detection, there is no need to toboggan those voxels whose potential is below the low threshold ("air") or above the high threshold ("contrast"). Of course, there is no need to look at any voxel outside of the lung. Therefore, initially, $$L(v) = \begin{cases} \text{"out"} & \text{if } v \text{ is outside of the lungs,} \\ \text{"air"} & \text{if } P(v) < lt, \\ \text{"contrast"} & \text{if } P(v) > ht, \\ \text{"nil"} & \text{otherwise,} \end{cases} \qquad (2)$$

and a tobogganing algorithm for PE detection may be regarded as a process that determines the label for those voxels with initial label of nil. Then, for each voxel v that is unlabeled, initializations are performed at step A. At Step B, each unlabeled voxel slides until reaching a labeled voxel or an unlabeled new concentration. The sliding function, tob( ), implements EQ. (1). If it reaches a labeled voxel, the label is propagated back to all the pixels along the sliding path at Step D, otherwise, at Step C, a new label is generated and then propagated back along the path. All the sliding directions are recorded during the process.

Referring to the simple PE image of FIG. 2(a), for detecting PE, the image is scanned row by row, but only those pixels with CT values between −50 HU and 100 HU are selectively slid. For illustration, an exemplary, non-limiting 2D four-connected neighborhood is used. Referring now to FIG. 2(b), the arrows indicate the sliding directions. During the tobogganing, the first pixel with CT value between −50 HU and 100 HU is pixel (7,2), which slides towards to pixel (7,1). Since the CT value of pixel (7,1) is −74 HU, and is pre-labeled as "air", label "air" is propagated back to pixel (7,2). During the tobogganing process, the first pixel collected as PE pixel is pixel (4,5), because it slides down to pixel (4,6) and then concentrates at pixel (5,6) with CT value above −50 HU. Consequently, a PE label is generated and assigned to pixel (5,6) and propagated back to pixels (4,6) and (4,5). When it is done for all the pixels in the image, the light gray pixels around the arteries have all merged into darker regions with CT values below −50 HU and all the PE pixels stand out, which are circled in FIG. 2(b). In this example, two toboggan clusters are formed for the detected PE pixels: the pixel (3,6) is a single-pixel toboggan cluster, while the other pixels form one cluster with concentration at pixel (5,6), indicated by the lines connecting them in FIG. 2(b). To achieve the goal of PE detection, the adjacent toboggan clusters (with detected PE pixels) are merged into a connected component, called a PE candidate, so that a detection position (3D point) can be derived by ultimate erosion to represent the candidate.

This basic tobogganing algorithm is intuitive and clearly useful in detecting PEs. However, it only labels the PE voxels, providing suspicious PE regions. For PE detection, the detected PE pixels should be grouped into connected components, forming PE candidates. This means that the whole volume needs to be scanned at least twice: once for tobogganing and the second for connected component analysis, before reporting any detected PEs. In other words, the user (radiologist) has to wait the completion of two scans before reviewing and approving any PE detections.

Concentration Oriented Tobogganing

During a PE search process according to an embodiment of the invention, a goal is, once a PE pixel is encountered, to extract a whole PE candidate from the pixel immediately and send it to the user (radiologist) for review and approval. A PE candidate includes multiple toboggan clusters. Naturally, to achieve the goal, one must first have an algorithm which can extract a toboggan cluster from any given pixel and provide the external boundary pixels of the cluster. An exemplary process of extracting a toboggan cluster from a given pixel according to an embodiment of the invention, referred to herein below as Algorithm 2, is presented in FIG. 7, which is interactively invoked for detecting PEs by Algorithm 3, presented in FIG. 8.

FIGS. 3(*a*)-(*d*) illustrates the use of a concentration-oriented toboggan algorithm according to an embodiment of the invention for PE detection. Referring to Algorithm 2, a concentration oriented tobogganing algorithm according to an embodiment of the invention includes two steps. It first searches for a concentration c from a given voxel s using the tob( ) function at Step A, and then, at Step B, expands from the found concentration c, whose CT intensity value is in the PE intensity range, to extract the whole toboggan cluster C. The expansion includes a base step (Step B.1) and an iterative step (Step B.2). In the base step B.1, it includes the concentration C as the first voxel in the cluster and pushes all its neighbors with CT values between −50 HU and 100 HU onto an active list A. The conditions for selecting voxels for the active list can be expressed as:

$$\forall r \in N(v), A \leftarrow r \text{ if } (r \notin A) \text{ and } (r \notin C) \text{ and } (P(r) \in [lt, ht]). \quad (3)$$

In the iterative step B.2, it selects voxel q with the minimal CT value from the active list A: $q = \arg\min_{a \in A} P(a)$. If the selected voxel toboggans to an already clustered voxel, then it conditionally pushes its neighbors to the active list A to ensure the uniqueness of the voxels in the active list, otherwise, the selected voxel belongs to the cluster's external boundary B. The iterative step is repeated till the active list A is empty. This concentration oriented tobogganing algorithm is repeatedly applied on all those external boundary voxels, until a whole PE candidate has been extracted.

Referring to FIGS. 3(*a*)-(*d*), when the example image is scanned in row by row, the first PE voxel encountered is (4,5), because it does not merge into regions with CT value below −50 HU. Therefore, it is desired to extract the whole PE from the voxel at (4,5). Voxel (4,5) is circled in FIG. 3(*a*). FIG. 3(*a*) illustrates Step A of the algorithm: finding the concentration. It regards the starting location as the current location, slides it to its neighbor with minimal CT value, as indicated by the arrows in FIG. 3(*a*), then selects the neighbor as the current location and slides it until reaching a concentration. Once the concentration is found, indicated by reference number 31, if its CT value is between −50 HU and 100 HU, Step B is initiated to expand from the concentration to cover a whole toboggan cluster and provide all the external boundary voxels, the other circled voxels, as shown in FIG. 3(*b*). In this example, the concentration (5,6) is included into the cluster and then all its neighbors with CT values in the PE HU range are pushed into an active list. A voxel with the minimal CT value is selected from the active list. In this case, it is voxel (4,6), indicated by reference number 32. Since it slides towards voxel (5,6), which has been included into the cluster, its neighbors are conditionally pushed into the active list. The condition is that the neighbor must have CT value in the PE HU range, and has not been included in the cluster and the active list, as expressed in EQ. (3), above. A new voxel with the minimal CT value is selected from the active list. For this time, it is voxel (3,6), reference number 33, but it does not slides towards any voxels within the cluster, therefore, it is a voxel on the external boundary of the cluster, and no processing is performed on its neighbors. Repeatedly select a new voxel from the active list and process it in the same way till the active list is empty. Once done, one obtains all the voxels within the cluster, namely, (4,5), (4,6), (5,5), (5,6) and (6,5), as well as the voxels along the external boundary of the cluster (circled in FIG. 3(*b*)). The concentration oriented tobogganing algorithm is then iteratively applied on each of the external boundary pixels with CT value in the PE HU range as indicated in FIG. 3(*c*). An exemplary iterative loop according to an embodiment of the invention embedding a call to the concentration oriented tobogganing algorithm according to an embodiment of the invention is presented in FIG. 8 as Algorithm 3. Referring to Algorithm 3, the concentration oriented tobogganing algorithm of Algorithm 2, denoted in Algorithm 3 as COT(s,p,lt,ht), is called for each voxel in the image. Then, for each non-empty cluster returned, the COT (s,p,lt,ht) is called for each of the boundary voxels. Any additional extracted toboggan cluster is merged into the previously extracted toboggan clusters, and any additional external boundary pixels are also merged. Once no external boundary pixel is left, all the toboggan clusters are extracted and merged, automatically forming a connected component 34, shown in FIG. 3(*d*)—a PE candidate. This result is identical to that depicted in FIG. 2(*b*).

Proposition: Algorithm 3 provides identical PE detections as Algorithm 1, but can also report any detection immediately once becoming available during searching.

Detection Performance

For testing a toboggan-based detection algorithm according to an embodiment of the invention, there were collected 177 cases with 872 clots marked by expert chest radiologists at four different institutions (two North American sites and two European sites). They are divided into two sets: training (45 cases with 156 clots) and testing (132 cases with 716 clots). The training cases were used in the development process for algorithm developing, improving and testing, while the testing cases were only used for algorithm testing and were never used for development.

All 177 cases were processed with a concentration oriented algorithm according to an embodiment of the invention, which generated a total of 8806 candidates: 2431 candidates appear in the training set and 6375 candidates in the test set. Each candidate is a connected component—a cluster of voxels, and represented by a representative point with a 3-D coordinate derived from the cluster of voxels.

Each candidate was then labeled as a PE or not based on 3-D landmark ground truth provided by the experts. To automatically label each candidate, each PE identified by an expert landmark is semi-automatically extracted and segmented. Therefore, the ground truth for each PE is also a cluster of voxels, that is, the segmented PE. Any candidate that was found to intersect with any of the segmented PEs in the ground truth was labeled as a PE. Multiple candidates may intersect with the same segmented PE, that is, multiple candidates may correspond to a single PE. Each PE is assigned with a unique identifier, therefore, multiple candidates may be labeled with the same PE identifier.

An algorithm according to an embodiment of the invention successfully detected 90.38% (141/156) of the PE in the training cases and 90.1% (645/716) of the PE in the testing cases. On average, the total computation time for each case is about 2 minutes on a 2.4 GHz P4 PC and the first detection, if any, in a case is reported within 27 seconds. However, on average, a concentration oriented algorithm according to an embodiment of the invention also produces candidates that do not intersect with any PEs. These candidates are regarded as false positives. On average, 47.5 and 40.3 false positives for each case are generated for the training set and the test set, respectively. However, a system that "cries wolf" too often will be rejected out of hand by radiologists. Thus, it is desired to detect as many true PEs as possible, subject to a constraint on false positives, usually less than or equal to 4 false positives per case. Therefore, according to an embodiment of the invention, a novel classification framework is provided based on mathematical programming to reduce the occurrence of false positives. The results are summarized in the following table.

| Dataset | Traning | Testing |
|---|---|---|
| No. Candidates | 2431 | 6375 |
| No. PEs in ground truth | 156 | 716 |
| No. PEs detected in candidates | 141 | 645 |
| No. false positives | 47.5 | 40.3 |

False Positive Reduction

For clinical acceptability, it is useful to control false positive rates and detect as many true PEs as possible. A PE can be large, or have an elongated shape along the vessel, or split at a vessel bifurcation. Multiple candidate clusters can exist to intersect with a single PE. As long as one of the candidates is identified and visualized to a physician, the entire PE can be easily traced out. Consequently, it is sufficient to detect one candidate for each PE. Correct classification of every candidate instance is not as important as the ability to detect at least one candidate for each PE.

To reduce false positives by classification, a set of 116 descriptive properties of a candidates, called features, are computed. These features were all image-based features and were normalized to a unit range, with a feature-specific mean. The features can be categorized into those that are indicative of voxel intensity distributions within the candidate, those summarizing distributions in neighborhood of the candidate, and those that describe the 3-D shape of the candidate and enclosing structures. When combined these features can capture candidate properties that can disambiguate typical false positives, such as dark areas that result from poor mixing of bright contrast agents with blood in veins, and dark connective tissues between vessels, from true emboli. These features are not necessarily independent, and may be correlated with each other, especially with features in the same group.

Classification

Assume that a total of l candidates are extracted, each represented by a feature vector $x_i$ associated with a label $y_i$. The label $y_i=1$ if the candidate overlays a PE, otherwise $y_i=-1$. Let $I^+$ and $I^-$ be two index sets containing indices of candidates that intersect with PEs and do not intersect with PEs, respectively. Let m be the total number of PEs marked by expert radiologists for the n images. Denote $I_j$ as the index set of the candidates that intersect with the $j^{th}$ PE, j=1, . . . , m. Notice that although $\cup_{j=1,\ldots,m} I_j = I^+$, any two index sets $I_j$'s are not necessarily disjoint since there may exist a candidate cluster that intersects with more than one segmented PE.

The support vector machine (SVM) has been a successful methodology for classification and regression. It constructs linear classification functions of the form $w^T x+b$ by minimizing a hinge error defined as $\xi=\max\{0, 1-y(w^T x)\}$ for all candidates. According to an embodiment of the invention, a more effective classification approach can be derived by exploring the observation that once a candidate in $I_j$ is classified as a positive, then the $j^{th}$ PE is considered identified. This consideration motivates the resulting classifier to focus on a different PEs instead of multiple candidates within a single PE. It facilitates the reduction of false positives by ignoring possibly extremely noisy candidates that intersect with some PEs where, for the same PE, other associated candidates can be easily classified correctly.

Figure 4A:
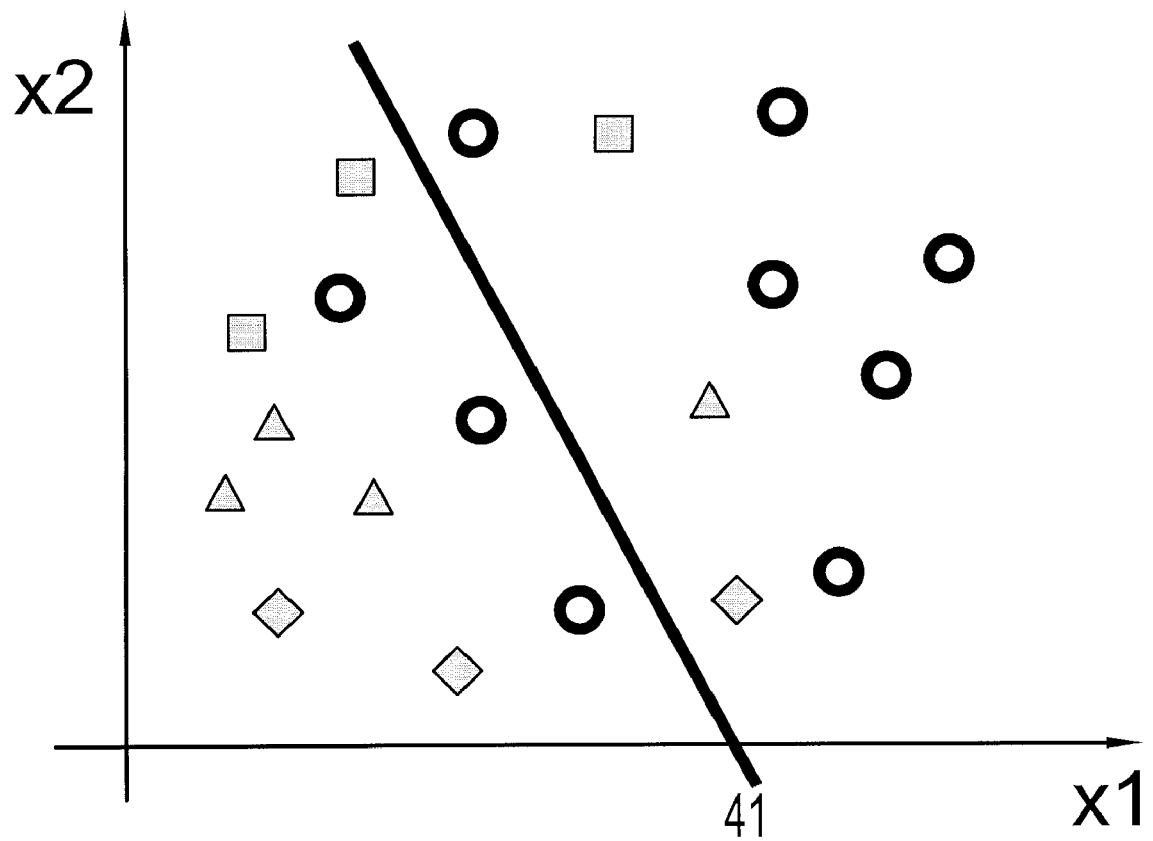
FIGS. 4(a)-(b) illustrate a geometric interpretation of a Support Vector Machine in a 2-D feature space, according to an embodiment of the invention.
Figure 4B:
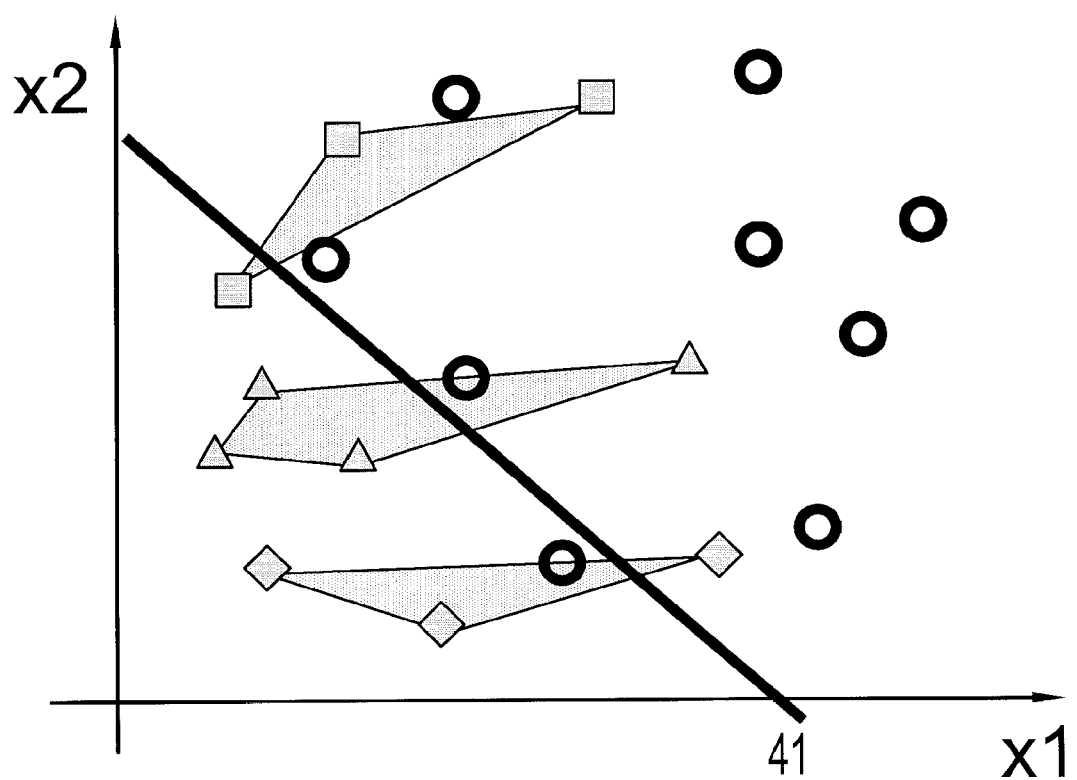

FIGS. 4(a)-(b) illustrate a geometric interpretation of an SVM in a 2-D feature space. A standard SVM, shown in FIG. 4(a), focuses on separating all candidates to correct sides. The line 41 is the linear separation boundary computed by a standard SVM, where circles represent false detections, and the symbols (diamond, box and delta) each represents one PE with multiple candidates. On the other hand, a multiple instance learning algorithm according to an embodiment of the invention, illustrated in FIG. 4(b), classifies at least one true PE candidate into one side and others on the other side, thus successfully removing all negative detections. One result of this is that the separation boundary 41 may be shifted or rotated. The diamonds, boxes, and triangle symbols are respectively connected in FIG. 4(b) to indicate that they are part of the same PE. However, only one detection for each candidate needs to be classified correctly.

Mathematically, distinguishing at least one candidate for each PE from the negative class is equivalent to the statement that as long as the minimum number of the errors ($\xi$) associated with the candidates associated with a PE is 0, then that PE is detected. For example, if a PE is associated with 3 candidates, and a classifier generates $\xi_1=0$ for the first candidate, and $\xi_2=5$, $\xi_3=100$ for the other two candidates, the classifier detects the PE. Correspondingly, this implies constructing the classifier by solving the following optimization program:

$$\min_{w,\xi} \gamma\|w\|_1 + \sum_{j=1}^{m} \min\{\xi_i, i \in I_j\} + \sum_{i \in I^-} \xi_i, \quad (4)$$

$$\text{s.t. } w^T x_i + b \geq 1 - \xi_i, i \in I^+, I^+ = \bigcup_{j=1}^{m} I_j$$

$$w^T x_i + b \leq -1 + \xi_i, i \in I^-,$$

$$\xi_i \geq 0, i = 1, \ldots, l.$$

This optimization program is computationally difficult to solve since it involves a minimization of the to-be-determined variables $\xi$ in the evaluation of the objective function, and is neither differentiable nor convex. Hence an equivalent conversion of the program to a more tractable optimization program is desired. The following quadratic program is equivalent to program (4). Any solution $\hat{w}$ of Program (4) is also an optimal solution to Program (5) with properly chosen $\lambda$, and vice versa.

$$\min_{w,\xi} \gamma\|w\|_1 + \sum_{j=1}^{m}\left(\sum_{i\in I_j}\lambda_i\xi_i\right) + \sum_{i\in I^-}\xi_i, \quad (5)$$

$$\text{s.t.} \quad w^T x_i + b \geq 1 - \xi_i, i \in I^+, I^+ = \bigcup_{j=1}^{m} I_j$$

$$w^T x_i + b \leq -1 + \xi_i, i \in I^-,$$

$$\xi_i \geq 0, i = 1, \ldots, l,$$

$$\sum_{i\in I_j}\lambda_i = 1, \lambda_i \geq 0, i \in I_j, j = 1, \ldots, m.$$

Once Programs (4) or (5) have been solved on a training set of PEs, the resulting classifier $w^T x+b$ can be applied to any newly detected PE candidate to determine with an increased confidence whether the candidate is a PE. For a newly detected PE candidate, a feature vector x is calculated and compared to the classifier $w^T x+b$, which separates the feature space into a true candidate space and a false candidate space.

Figure 5:
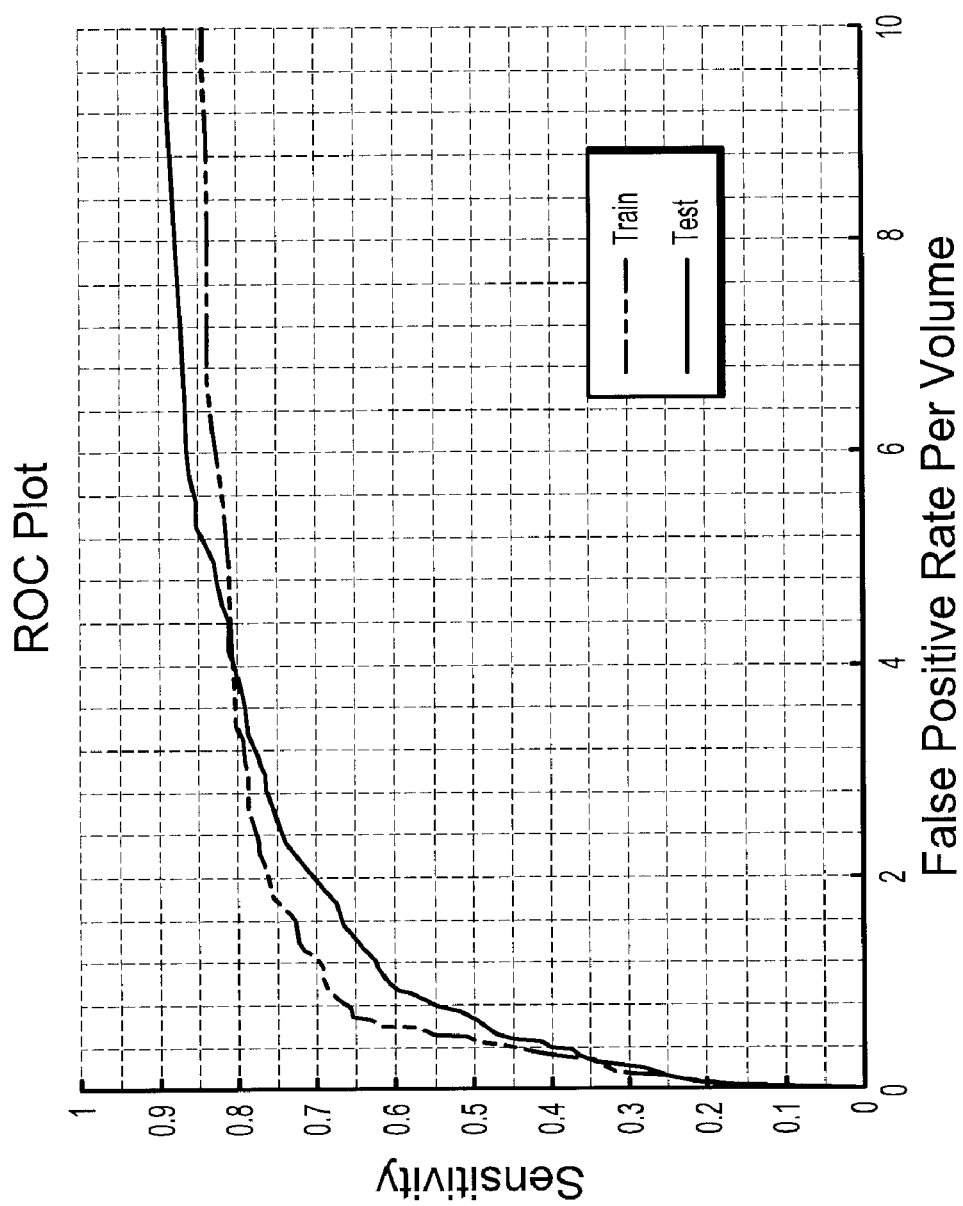
FIG. 5 depicts the Receiver Operating Characteristics plot of a system that combines candidate detection, feature computation, and classification, according to an embodiment of the invention.

A classification algorithm according to an embodiment of the invention can reduce the false positive rate down to 4 false positives per patient while maintaining a high detection sensitivity. FIG. 5 depicts the Receiver Operating Characteristics (ROC) plot of a final system according to an embodiment of the invention that combines the candidate detection, feature computation, and classification. As shown in FIG. 5, the final system detects 80% of the PEs, respectively, for the training study set and the test set at 4 false positive per patient.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 9:
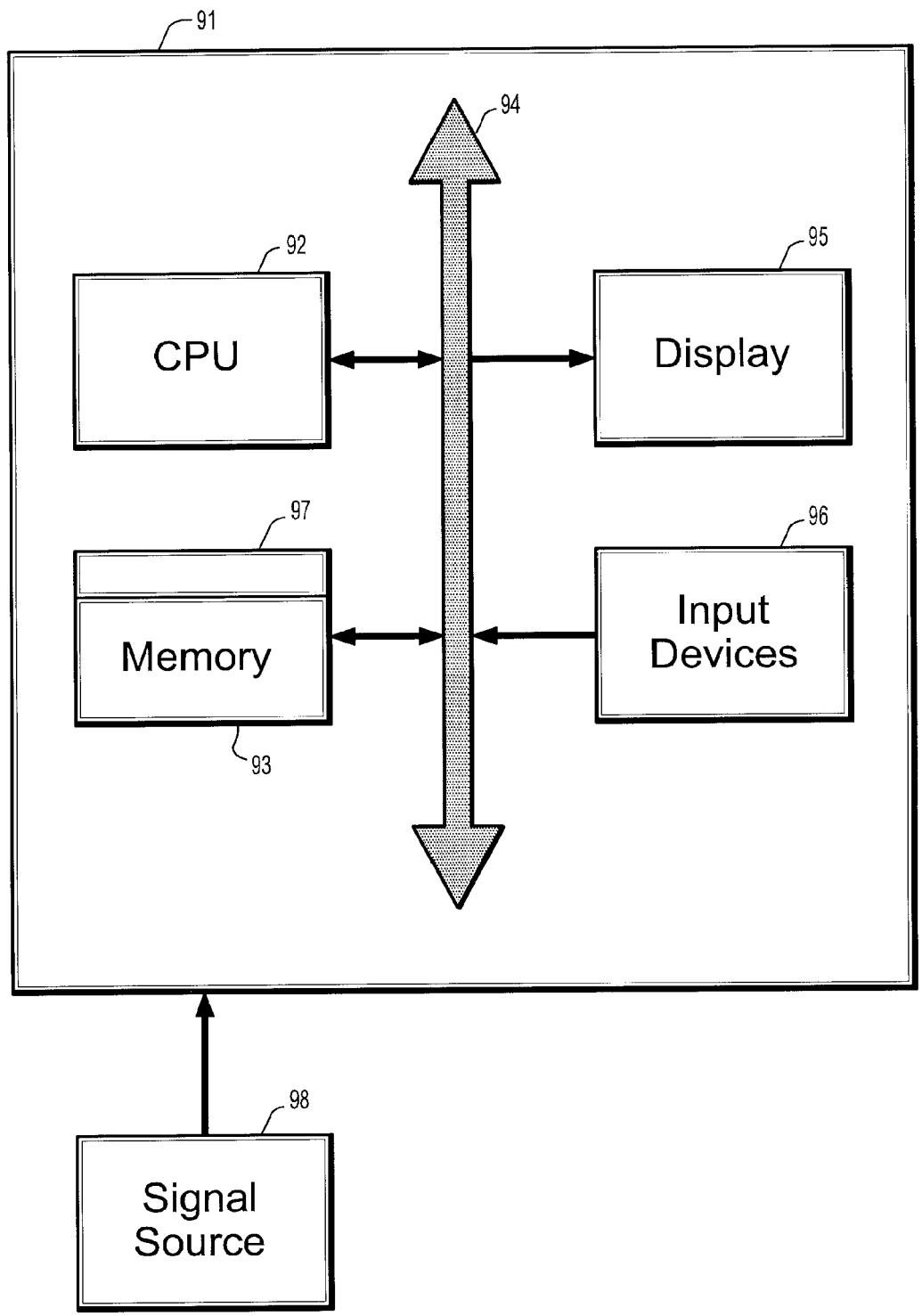
FIG. 9 is a block diagram of an exemplary computer system for implementing a method for automatically detecting pulmonary embolisms in CT angiography, according to an embodiment of the invention.

FIG. 9 is a block diagram of an exemplary computer system for implementing a method for automatically detecting pulmonary embolisms in CT angiography according to an embodiment of the invention. Referring now to FIG. 9, a computer system 91 for implementing an embodiment of the present invention can comprise, inter alia, a central processing unit (CPU) 92, a memory 93 and an input/output (I/O) interface 94. The computer system 91 is generally coupled through the I/O interface 94 to a display 95 and various input devices 96 such as a mouse and a keyboard. The support circuits can include circuits such as cache, power supplies, clock circuits, and a communication bus. The memory 93 can include random access memory (RAM), read only memory (ROM), disk drive, tape drive, etc., or a combinations thereof. The present invention can be implemented as a routine 97 that is stored in memory 93 and executed by the CPU 92 to process the signal from the signal source 98. As such, the computer system 91 is a general purpose computer system that becomes a specific purpose computer system when executing the routine 97 of the present invention.

The computer system 91 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for detecting pulmonary embolisms in computed tomographic (CT) angiography using a processor, said method comprising the steps of:
providing a digitized CT image acquired from the inside of a pulmonary vessel, said image comprising a plurality of intensities corresponding to a 3-dimensional grid comprising a first plurality of voxels;
for each of the first plurality of voxels in said image,
extracting a first pulmonary embolism (PE) candidate and first PE boundary; and
for each of a second plurality of voxels within said first PE boundary,
selecting a voxel of the second plurality of voxels;
extracting a subsequent PE candidate and subsequent PE boundary from said selected voxel;
merging said subsequent PE candidate with said first PE candidate; and
merging said subsequent PE boundary with said first PE boundary;
wherein extracting a first or second pulmonary embolism (PE) candidate and first or second PE boundary from each of a first or second plurality of voxels, respectively comprises:
tobogganing said voxel to a first concentration voxel:
initializing a cluster with said first concentration voxel, and assigning to an active list all neighboring voxels whose intensity is indicative of being part of an embolism;
removing a voxel with a minimal intensity from said active list;
tobogganing said removed voxel to a second concentration voxel, wherein if said second concentration voxel is part of said cluster, assigning neighbors of said removed voxel to said active list, otherwise assigning said removed voxel to a boundary of said cluster; and
repeating said steps of removing a voxel from said active list and tobogganing said removed voxel to a second concentration voxel until said active list is empty, wherein said cluster is the pulmonary embolism candidate; and
wherein each of the foregoing steps is performed using a processor.

2. The method of claim 1, wherein tobogganing a voxel comprises finding a concentration voxel from among said voxel and its neighboring voxels that has a minimum intensity.

3. The method of claim 1, further comprising adding said removed voxel to said cluster, when said second concentration voxel is part of said cluster.

4. The method of claim 1, wherein an intensity indicative of being part of an embolism is in the range of between about −50 Hounsfield Units (HU) and about 100 HU.

5. The method of claim 1, further comprising classifying said pulmonary embolism candidate as a true candidate or a false candidate by calculating an image-based feature vector x for said candidate and comparing said feature vector to a classification function $w^T x + b$ which divides a feature space into a false candidate space and a true candidate space.

6. The method of claim 5, wherein said classifier function coefficients w and intercepts b are found by solving $$\min_{w,\xi} \gamma \|w\|_1 + \sum_{j=1}^{m} \left( \sum_{i \in I_j} \lambda_i \xi_i \right) + \sum_{i \in I^-} \xi_i,$$

$$\text{s.t. } w^T x_i + b \geq 1 - \xi_i, i \in I^+, I^+ = \bigcup_{j=1}^{m} I_j$$

$$w^T x_i + b \leq -1 + \xi_i, i \in I^-,$$

$$\xi_i \geq 0, i = 1, \ldots, l,$$

$$\sum_{i \in I_j} \lambda_i = 1, \lambda_i \geq 0, i \in I_j, j = 1, \ldots, m,$$

for a training set of true and false pulmonary embolism candidates, wherein $I^+$ and $I^-$ are index sets containing indices of true candidates that intersect with PEs and false candidates that do not intersect with PEs, respectively, and $I_j$ is an index set of the candidates that intersect with a $j^{th}$ PE, $j=1, \ldots, m$.

7. A program storage device readable by a computer, tangibly embodying a program of instructions executable by the computer to perform the method steps for detecting pulmonary embolisms in computed tomographic (CT) angiography, said method comprising the steps of:
  providing a digitized CT image acquired from the inside of a pulmonary vessel, said image comprising a plurality of intensities corresponding to a 3-dimensional grid comprising a first plurality of voxels;
  for each of the first plurality of voxels in said image,
    extracting a first pulmonary embolism (PE) candidate and first PE boundary; and
    for each of a second plurality of voxels within said first PE boundary,
      selecting a voxel of the second plurality of voxels;
      extracting a subsequent PE candidate and subsequent PE boundary from said selected voxel;
      merging said subsequent PE candidate with said first PE candidate; and
      merging said subsequent PE boundary with said first PE boundary
  wherein extracting a first or second pulmonary embolism (PE) candidate and first or second PE boundary from each of a first or second plurality of voxels, respectively comprises:
    tobogganing said voxel to a first concentration voxel;
    initializing a cluster with said first concentration voxel, and assigning to an active list all neighboring voxels whose intensity is indicative of being part of an embolism;
    removing a voxel with a minimal intensity from said active list;
    tobogganing said removed voxel to a second concentration voxel, wherein if said second concentration voxel is part of said cluster, assigning neighbors of said removed voxel to said active list, otherwise assigning said removed voxel to a boundary of said cluster; and
    repeating said steps of removing a voxel from said active list and tobogganing said removed voxel to a second concentration voxel until said active list is empty, wherein said cluster is the pulmonary embolism candidate.

8. The computer readable program storage device of claim 7, wherein tobogganing a voxel comprises finding a concentration voxel from among said voxel and its neighboring voxels that has a minimum intensity.

9. The computer readable program storage device of claim 7, the method further comprising adding said removed voxel to said cluster, when said second concentration voxel is part of said cluster.

10. The computer readable program storage device of claim 7, wherein an intensity indicative of being part of an embolism is in the range of between about −50 Hounsfield Units (HU) and about 100 HU.

11. The computer readable program storage device of claim 7, the method further comprising classifying said pulmonary embolism candidate as a true candidate or a false candidate by calculating an image-based feature vector x for said candidate and comparing said feature vector to a classification function $w^T x + b$ which divides a feature space into a false candidate space and a true candidate space.

12. The computer readable program storage device of claim 11, wherein said classifier function coefficients w and intercepts b are found by solving $$\min_{w,\xi} \gamma \|w\|_1 + \sum_{j=1}^{m} \left( \sum_{i \in I_j} \lambda_i \xi_i \right) + \sum_{i \in I^-} \xi_i,$$

$$\text{s.t. } w^T x_i + b \geq 1 - \xi_i, i \in I^+, I^+ = \bigcup_{j=1}^{m} I_j$$

$$w^T x_i + b \leq -1 + \xi_i, i \in I^-,$$

$$\xi_i \geq 0, i = 1, \ldots, l,$$

$$\sum_{i \in I_j} \lambda_i = 1, \lambda_i \geq 0, i \in I_j, j = 1, \ldots, m,$$

for a training set of true and false pulmonary embolism candidates, wherein $I^+$ and $I^-$ are index sets containing indices of true candidates that intersect with PEs and false candidates that do not intersect with PEs, respectively, and $I_j$ is an index set of the candidates that intersect with a $j^{th}$ PE, $j=1, \ldots, m$.

* * * * *